United States Patent
Dalum

(10) Patent No.: US 6,236,308 B1
(45) Date of Patent: May 22, 2001

(54) RESTRAINT DEPLOYMENT CONTROL METHOD WITH SPEED-DEPENDENT ADJUSTMENT OF DEPLOYMENT THRESHOLD

(75) Inventor: Joseph Thomas Dalum, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/307,856

(22) Filed: May 10, 1999

Related U.S. Application Data

(63) Continuation-in-part of application No. 09/188,988, filed on Nov. 9, 1998.

(51) Int. Cl.$^7$ .................................................. B60Q 1/00
(52) U.S. Cl. .................. 340/436; 340/903; 307/10.1; 701/45; 280/735; 180/282
(58) Field of Search .................... 340/436, 435, 340/901, 903, 904; 307/10.1; 701/45; 280/735; 180/282, 273

(56) References Cited

U.S. PATENT DOCUMENTS 5,969,599 * 10/1999 Wessels et al. ..................... 340/436

\* cited by examiner

Primary Examiner—Nina Tong
(74) Attorney, Agent, or Firm—Jimmy L. Funke

(57) ABSTRACT

An improved deployment method for a vehicular supplemental restraint system having an acceleration sensor and a restraint device to be deployed for occupant protection in a crash event, where the deployment is initiated when a filtered version of the acceleration signal exceeds a deployment threshold that is periodically adjusted based on one or more secondary measures of crash severity, including a vehicle speed measurement at the onset of the crash event, and the level of event progression. In a first embodiment, the vehicle speed measurement pertains to the ground or absolute speed of the vehicle at the onset of the crash event; in a second embodiment, the vehicle speed measure pertains to the vehicle speed relative to a detected obstacle at the onset of the crash event.

10 Claims, 4 Drawing Sheets

RESTRAINT DEPLOYMENT CONTROL METHOD WITH SPEED-DEPENDENT ADJUSTMENT OF DEPLOYMENT THRESHOLD

RELATED APPLICATIONS

This application is a continuation-in-part of U.S. Pat. No. 5,969,599, issued on Oct. 19, 1999 application Ser. No. 09/188,988, filed Nov. 9, 1998, and assigned to the assignee of the present invention.

TECHNICAL FIELD

This invention relates to automotive passenger restraint systems, and more particularly to a control method that differentiates deployment events from non-deployment events.

BACKGROUND OF THE INVENTION

In general, automotive passenger restraint systems perform a number of functions including acceleration sensing, signal processing and analysis, and deployment of one or more restraint devices such as frontal or side air bags and seat belt pretensioners in response to a sensed crash event. Typically, the acceleration signal is monitored to detect a potential crash event, and then filtered or integrated over the course of the crash event to produce a velocity change or $\Delta V$ signal. If the $\Delta V$ signal exceeds a threshold, the crash event is determined to be sufficiently severe to warrant deployment of restraints. The threshold is typically time-dependent, and is calibrated based on data logged for different types of crash events, as well as data logged during rough road driving.

There are a number of drawbacks with the above-described approach. For example, it is often difficult to reliably synchronize the time progression of the crash (that is, the event clock or timer) with the actual crash event. This makes it difficult to distinguish between deployment events and non-deployment events, particularly in the first portion of the sensed event. Additionally, it is difficult to deploy restraints quickly enough in certain high speed crash events and localized impacts if the deployment decision is based solely on a detected change in velocity ($\Delta V$) as described above.

SUMMARY OF THE INVENTION

The present invention is directed to an improved deployment method for a vehicular supplemental restraint system having an acceleration sensor and a restraint device to be deployed for occupant protection in a crash event, where the deployment is initiated when a filtered version of the acceleration signal exceeds a deployment threshold that is periodically adjusted based on one or more secondary measures of crash severity, including a measure of vehicle speed at the onset of the crash event, and the level of event progression. Preferably, the level of event progression is determined by deriving a $\Delta V$ signal biased toward zero, and comparing such signal to a set of predefined event progression thresholds.

In a preferred embodiment, the deployment threshold is set to a relatively high default level during periods of inactivity to provide good immunity to rough road impacts, while providing timely deployment for high speed crash events, and is periodically adjusted from the default level in the course of a sensed event. At each level or stage of the event progression, the deployment threshold is adjusted within predefined boundaries based on the measure of vehicle speed. In a first embodiment, the vehicle speed measurement pertains to the ground or absolute speed of the vehicle at the onset of the crash event; in a second embodiment, the vehicle speed measure pertains to the vehicle speed relative to a detected obstacle at the onset of the crash event.

BRIEF DESCRIPTION OF THE DRAWINGS

The present invention will now be described, by way of example, with reference to the accompanying drawings, in which:

FIG. 5 is a main flow diagram, and FIG. 6 details a step of the main flow diagram relating to determination of a threshold adaptation amount.

DESCRIPTION OF THE PREFERRED EMBODIMENT

Figure 1:
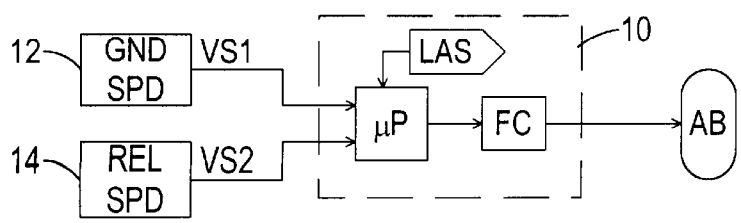
FIG. 1 is a schematic diagram of a supplemental restraint system including a programmed microprocessor for carrying out the deployment method of this invention.

FIG. 1 generally depicts a vehicle supplemental restraint system in which one or more restraints, such as air bags AB, are deployed in a severe crash event to protect the vehicle occupants. The restraints may include without limitation, air bags, belt pretensioners, inflatable tubular structures, side curtains, anti-whiplash devices, etc., and it will be understood that such term AB as used herein does not refer exclusively to a particular type of restraint. A deployment control system, designated generally by the reference numeral 10, may be packaged as a single electronic module and mounted on a frame element in a central portion of the vehicle. Fundamentally, the system 10 includes a longitudinal acceleration sensor LAS (which may comprise a single sensor or a pair of sensors mounted at an offset angle) for sensing longitudinal acceleration of the vehicle, a microprocessor $\mu P$ for receiving the output signal of longitudinal acceleration sensor LAS, and a firing circuit FC which is triggered by microprocessor $\mu P$ to deploy the air bags AB in the event of a severe crash. The microprocessor $\mu P$ also receives vehicle speed measures VS1 and/or VS2 developed by the sensors 12 and 14. The sensor 12 detects the ground or absolute speed of the vehicle, and may be part of an instrumentation or anti-lock brake system. The sensor 14 detects the speed of the vehicle relative to an obstacle in the vehicle travel path, and may be part of a collision warning/avoidance system, or an adaptive cruise control system. In either case, the microprocessor $\mu P$ maintains a series of velocity readings in a buffer, and upon achievement of a predetermined event, a selected reading is retrieved from the buffer and used along with event progression level to periodically adjust the deployment threshold. The predetermined event may be defined as the achievement of a specified event progression level or the achievement of acceleration in excess of a threshold.

In general, the microprocessor μP filters the longitudinal acceleration signal over a predefined interval, or window, to form a windowed velocity signal, referred to herein as $\Delta V_{WIN}$. In the illustrated embodiment, the signal $\Delta V_{WIN}$ may be calculated according to the expression:

$$\Delta V_{WIN}(n) = \Sigma[ACCEL(n-i)], \text{ for } i=0 \text{ to } (w-1)$$

where ACCEL is a filtered version of the output of acceleration sensor LAS and w is the window size. In a digital implementation, the window w actually refers to a specified number of successive samples of the acceleration signal, but since the samples are read at a predefined rate, the window w also may be viewed as a corresponding time interval. Prior to the detected collision, the microprocessor μP initializes a deployment threshold, referred to herein as a ΔV Threshold or $\Delta V_{THR}$, at a default value, and then during the crash event, adjusts the threshold based on event progression and the vehicle speed measurements VS1 and/or VS2. If $\Delta V_{WIN}$ crosses $\Delta V_{THR}$, the microprocessor μP signals the firing circuit FC to deploy the air bags AB.

Figure 2:
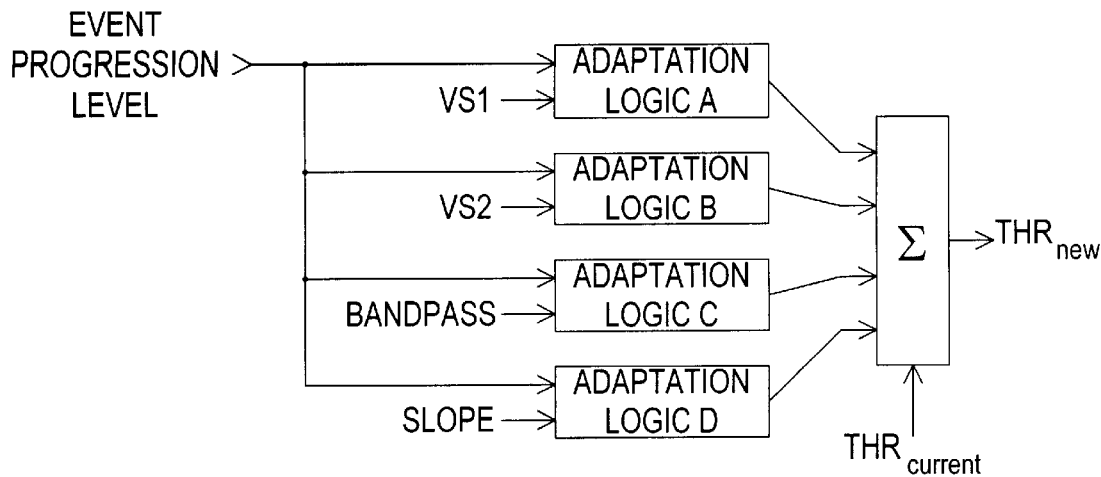
FIG. 2 is a block diagram of the functionality of the microprocessor of FIG. 1, according to this invention.

In a practical system, the microprocessor μP may advantageously consider several secondary measures in addition to VS1 and/or VS2 in adjusting ΔVTHR. This approach is illustrated in the block diagram of FIG. 2, which depicts a system in which the secondary measures include the speeds VS1 and VS2, a band-pass filtered version of ACCEL, and a measure of the slope of an acceleration or ΔV signal. As indicated in the diagram, the determined event progression level and a secondary measure are applied to each of several logic blocks identified as Adaptation Logic A through Adaptation Logic D. The logic blocks each form threshold adjustments associated with each of the respective secondary measures, and such adjustments are summed with the current threshold value (THRcurrent) in the summation block (Σ) to form a new threshold value (THRnew). If desired, weighting may be used to give more effect to certain adjustments than to others, and various limits may be applied to limit both individual and net adjustments.

The progression of the sensed event is preferably determined by a ΔV based signal designed to reject low acceleration noise due to road surface irregularities. Such a signal, referred to herein as $\Delta V_{bias}$, is determined by computing a filtered acceleration signal ΔV, and then applying a bias "B" that biases the signal toward zero. For example, ΔV may be calculated according to the expression:

$$\Delta V(n) = \Delta V(n-1) + ACCEL(n) - \Delta V(n-1)/C$$

where C is a constant, with $\Delta V_{bias}$ being defined as:

$$\Delta Vbias = \Delta V - B$$

and the bias B being defined as:

$$B = \begin{cases} d & \text{if } \Delta V > d, \text{ with } d \text{ being a positive integer} \\ \Delta V & \text{if } |\Delta V| \leq d \\ -d & \text{if } \Delta V < -d \end{cases}$$

Alternatively, the level of event progression can be determined by using windowed velocity $\Delta V_{WIN}$ within a limited acceleration range, or a timer based upon the time that a filtered version of $\Delta V_{WIN}$ or ΔV remains above a specified level. For purposes of this description, however, it will be assumed that $\Delta V_{bias}$ is used to determine the level of event progression. To this end, $\Delta V_{bias}$ is compared to a series of predefined velocity values, referred to herein as progression level thresholds a–d, thereby defining four corresponding stages or levels of event progression; obviously, the number of thresholds, and hence progression levels, may vary from one implementation to another. The approach is graphically depicted in Graph A of FIG. 3, which illustrates exemplary values of $\Delta V_{bias}$ in the course of a crash event. The time designations $t_0$–$t_6$ signify times that coincide with $\Delta V_{bias}$ crossing one of the thresholds a–d, and the event progression level at any given time is indicated at the top of Graph A. For example, progression level of the sensed event is "a" in the time interval $t_0$–$t_1$, "b" in the time interval $t_1$–$t_2$, "c" in the time interval $t_2$–$t_3$, "b" in the time interval $t_3$–$t_4$, and so on. The progression level "a" is indicative of no or very low activity.

Figure 3:
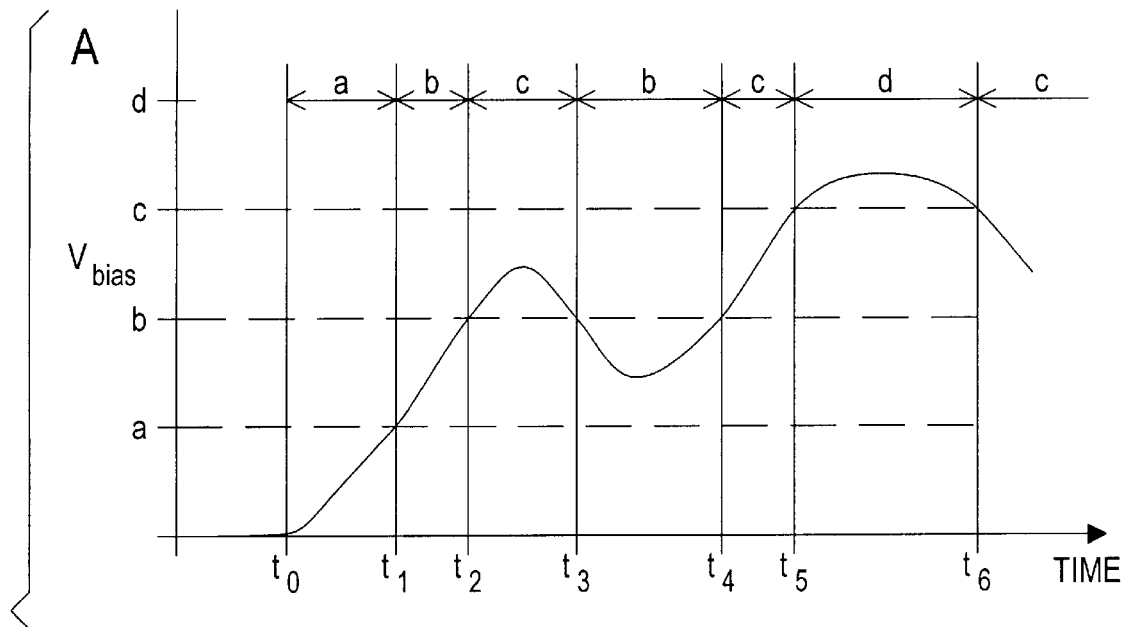
FIG. 3, Graphs A–B, form a graphical representation of event progression determination and speed-dependent threshold adjustment according to this invention.
Figure 3:
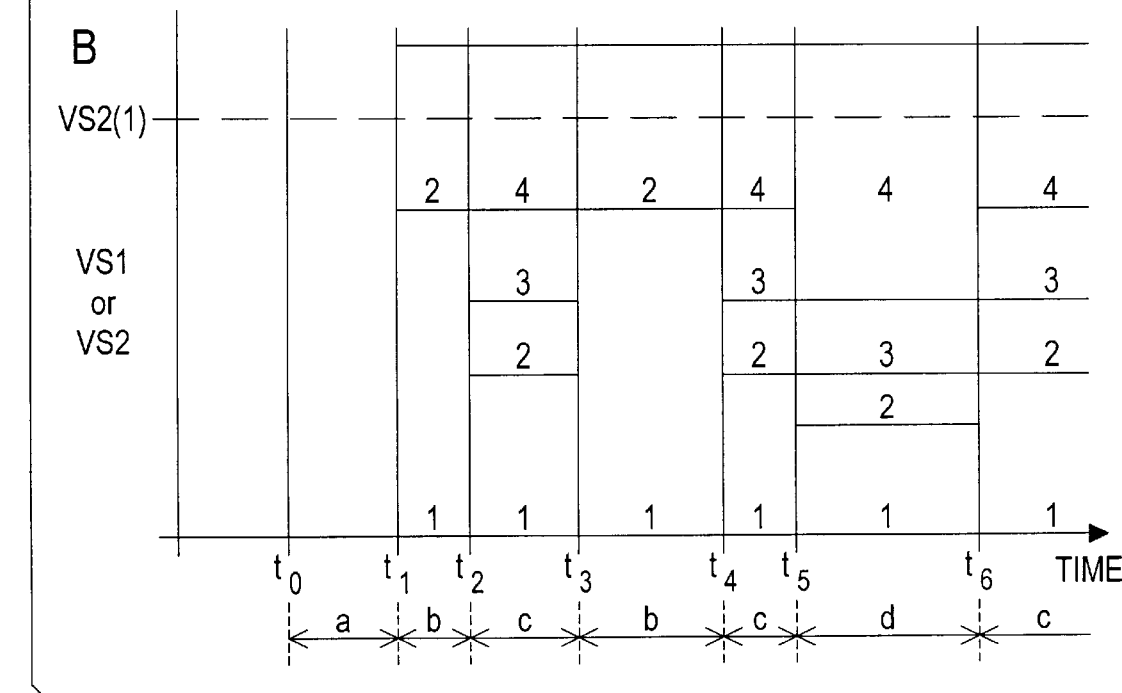

Graph B of FIG. 3 has the same time scale as Graph A, and depicts exemplary vehicle speed thresholds or regions corresponding to each of the event progression levels a–d. The vertical axis of Graph B represents a vehicle speed measurement (VS1 or VS2) at the onset of the crash event. As indicated above, the deployment threshold may be adjusted based solely on one of the two speed inputs VS1 or VS2, or on both of the speed inputs VS1 and VS2. Each of the progression levels a–d have predefined speed regions corresponding to different levels of the secondary measure VS1 or VS2, as shown by the horizontal thresholds in Graph B, and the threshold adjustment amount is determined based on which region the secondary signal is in. For example:

if the sensed event is in progression level "a", there is no adjustment;

if the sensed event is in progression level "b", a set of threshold adjustment rules might be: (1) no adjustment if the vehicle speed measure is in region 1, and (2) decrease $\Delta V_{THR}$ by 7 counts if the speed measurement is in region 2;

if the sensed event is in progression level "c", a set of threshold adjustment rules might be: (1) no adjustment if the vehicle speed measure is in region 1, (2) increase $\Delta V_{THR}$ by 5 counts if the speed measure is in region 2, (3) no adjustment if the vehicle speed measure is in region 3, and (4) decrease $\Delta V_{THR}$ by 10 counts if the speed measure is in region 4.

If the sensed event is in progression level "d", a set of threshold adjustment rules might be: (1) no adjustment if the vehicle speed measure is in region 1, (2) increase $\Delta V_{THR}$ by 5 counts if the speed measure is in region 2, (3) no adjustment if the vehicle speed measure is in region 3, and (4) decrease $\Delta V_{THR}$ by 12 counts if the speed measure is in region 4.

The usefulness of the above-described threshold adjustment technique can be illustrated by considering an example. Suppose that the speed measurement VS2 provided by speed sensor 14 indicates that there is a high relative velocity object in the vehicle travel path, as represented by the speed value VS2(1) on the vertical axis of Graph B. If the crash event never proceeds beyond level "a", the crash severity is insufficient to warrant deployment of the restraints, and there is no threshold adjustment based on the speed measure. This could occur, for example, if the vehicle were to strike a light-weight, but reasonably large, object such as a plywood barrier. However, if the crash is more severe, and reaches progression level "b", deployment may be warranted, and the threshold is decreased by 7 counts in each adjustment cycle, using the exemplary rules given above. If the crash reaches progression level "c", the threshold is decreased by 10 counts, and if the crash reaches progression level "d", the threshold is decreased by 12 counts. In this way, the effect of the measured velocity on the deployment threshold varies depending on the severity of the crash event, as represented by the event progression level. In a relatively low severity crash event, the threshold is not adjusted, thereby maintaining a high level of immunity to non-deployment events such as driving over a rough road. In relatively high severity crash events, the threshold is adjusted based on the secondary measure to provide earlier deployment in the case of a high speed crash event, or to reduce the likelihood of deployment in a low speed crash event.

Figure 4:
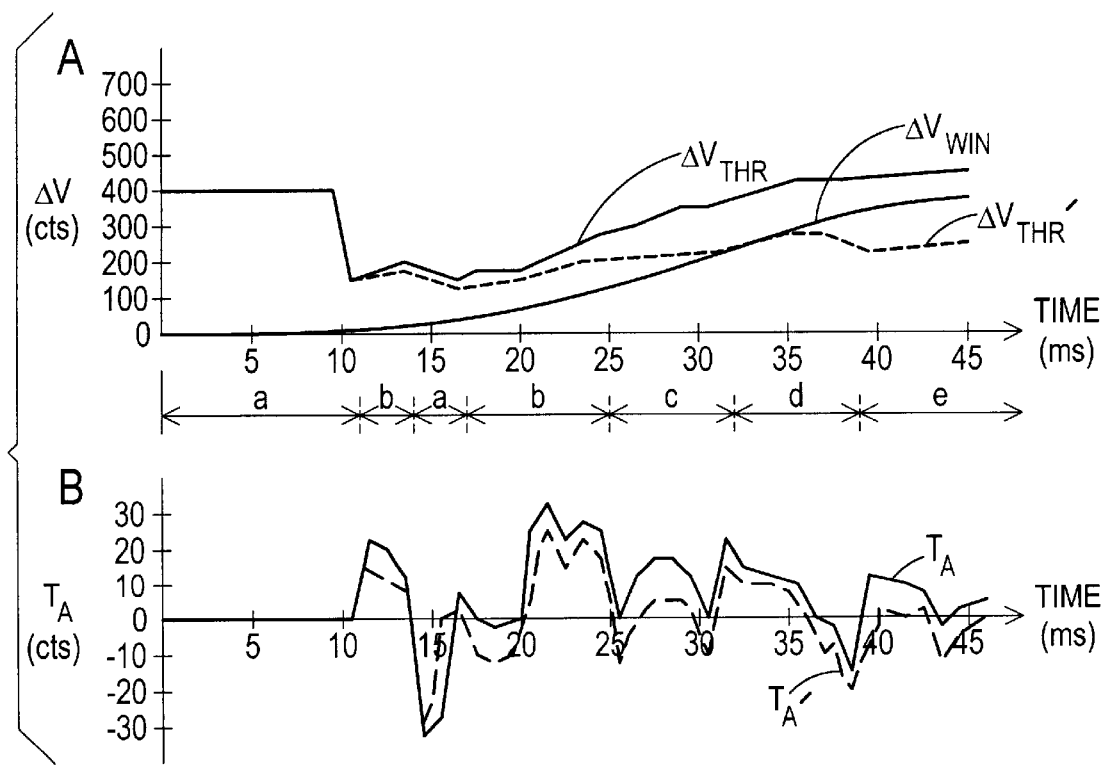
FIG. 4, Graphs A–B, form a graphical representation of a localized impact showing the effect of a speed dependent threshold adjustment according to this invention.

FIG. 4, Graphs A–B illustrate the operation of the invention in a crash event in which the left front side of the vehicle impacts a rigid stationary barrier, at a speed of 40.3 KPH (25 MPH). In this case, the vehicle speed signals VS1 and VS2 would be identical. Graphs A–B are depicted on a common time base in milliseconds (ms), with zero time representing a point 11 ms prior to the achievement of event progression level "b", i.e., when the velocity measures VS1 and/or VS2 are recorded. The vertical axes are graduated in "counts", an arbitrary scale used by the microprocessor $\mu$P. Graph A depicts the windowed velocity $\Delta V_{WIN}$ and a pair of deployment thresholds $\Delta V_{THR}$ and $\Delta V_{THR}'$. The threshold without speed dependent adjustment (but with adjustment based on other secondary measures) is designated by the solid trace $\Delta V_{THR}$, and the threshold with speed dependent adjustment is designated by the broken trace $\Delta V_{THR}'$. The event progression levels, in this case including levels a–e, are indicated below the time axis of Graph A. Graph B depicts the threshold modifications, with and without speed dependent adjustment; as in Graph A, the solid trace $T_A$ represents an adjustment amount without taking the vehicle speed into account, and the broken trace $T_A'$ represents the adjustment amount with the vehicle speed (VS1 or VS2) taken into account. In the illustrated example, deployment never occurs without speed dependent adjustment of the deployment threshold; that is, $\Delta V_{WIN}$ never reaches $\Delta V_{THR}$. However, when the speed measurement VS1 and/or VS2 is taken into account, the threshold adjustment $T_A'$ is reduced relative to the adjustment $T_A$, correspondingly reducing the threshold $\Delta V_{THR}$ to $\Delta V_{THR}'$. As a result, $\Delta V_{WIN}$ does reach $\Delta V_{THR}'$, and the restraints AB are deployed at time=35 ms.

Figure 5:
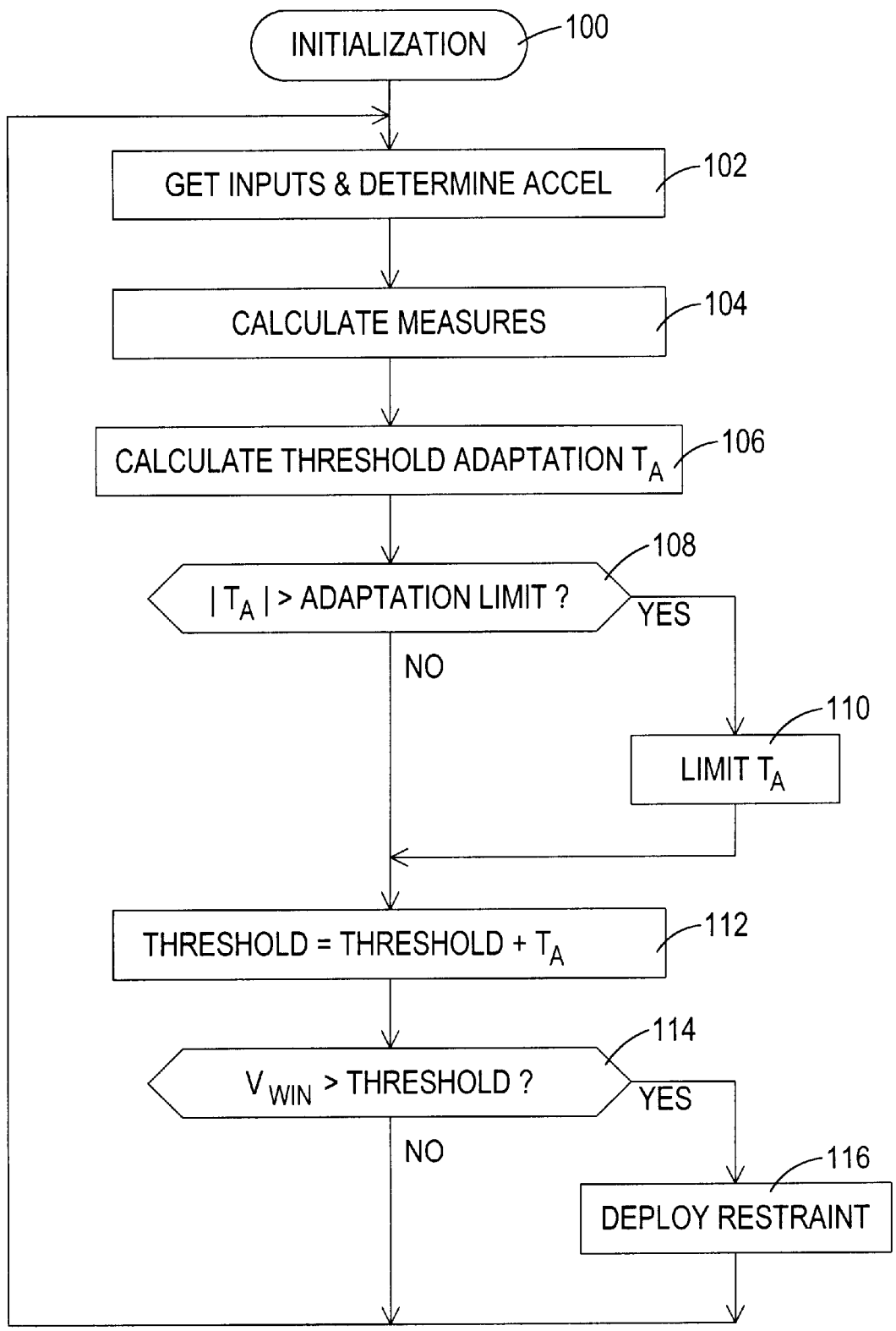
FIGS. 5–6 are flow diagrams representative of computer program instructions executed by the microprocessor of FIG. 1 in carrying out the deployment method of this invention.
Figure 6:
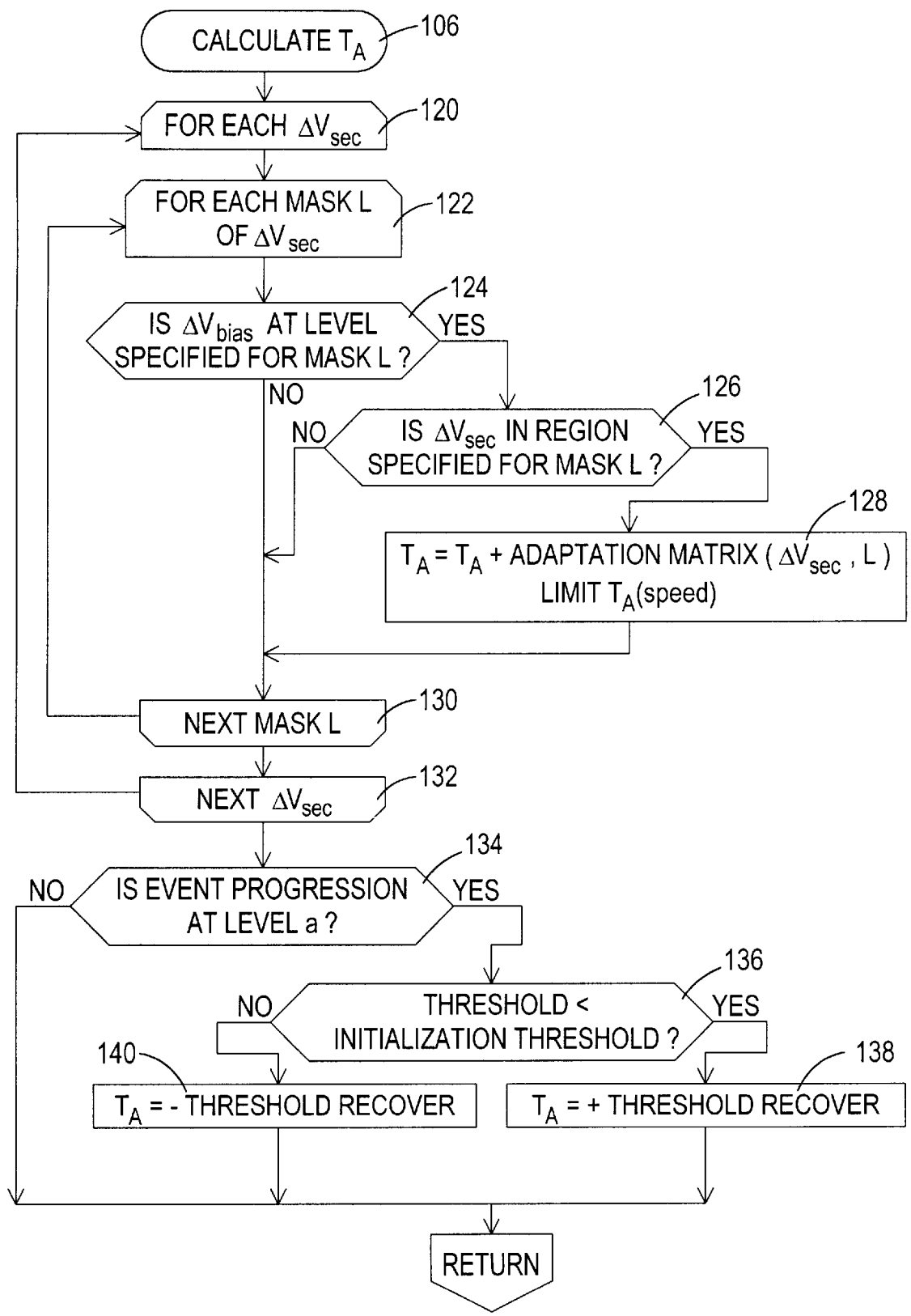

A flow diagram representative of computer program instructions executed by the microprocessor $\mu$P of FIG. 1 in carrying out the above-described deployment method is et forth in FIGS. 5–6. FIG. 5 depicts a main loop flow diagram, where the block 100 designates a series of instructions executed at the initiation of vehicle operation for initializing various registers, counters, flags and variables to a predefined state. For example, $\Delta V_{THR}$ is initialized to a default value at this point. Thereafter, the block 102 is executed to read the speed signals VS1 and/or VS2 and the output signal of the longitudinal acceleration sensor LAS, and to filter the acceleration signal to form a filtered acceleration signal ACCEL. Various other severity measurements are then computed at block 104, such as $\Delta V$, $\Delta V_{bias}$, $\Delta V_{WIN}$, $V_{sec1}$, $V_{sec2}$, and so on, where $V_{sec1}$ and $V_{sec2}$ are additional secondary measurements used to adjust the deployment threshold. Block 106 is then executed to determine a net threshold adaptation amount $T_A$, as described in detail below in reference to FIG. 6. If the magnitude of the determined adaptation amount $T_A$ is greater than a limit value, as determined at block 108, the block 110 is executed to suitably limit adaptation amount $T_A$. Then, the adaptation amount $T_A$ (which can be either positive or negative) is added to the $\Delta V$ Threshold at block 112. If the windowed velocity $\Delta V_{WIN}$ exceeds the newly adjusted threshold, as determined at block 114, the block 116 is executed to deploy the restraints AB.

The flow diagram of FIG. 6 sets forth the main flow diagram step of determining the net threshold adaptation amount $T_A$ (block 106) in further detail. In the illustrated embodiment, the various event progression thresholds a–d, the secondary measurement regions, and the associated threshold adjustment amounts are stored in an adaptation matrix within microprocessor $\mu$P, and a series of progression level masks for each secondary measurement are used to identify corresponding regions and adjustment amounts $T_A$. Blocks 120–132 comprise a nested loop for determining the net threshold adaptation amount $T_A$, taking into account each of the secondary measurements. Thus, for each secondary measurement $\Delta V_{sec}$, the microprocessor $\mu$P executes the blocks 122–130 within the $\Delta V_{sec}$ loop boundary blocks 120 and 132, and for each progression level mask L, the microprocessor $\mu$P executes the blocks 124–128 within the progression level loop boundary blocks 122 and 130. At block 124, the current mask L is applied to the matrix, and the microprocessor $\mu$P determines if the biased velocity $\Delta V_{bias}$ is within the corresponding progression level thresholds. If not, the mask L for the next progression level is applied to the matrix, as indicated at block 130. If $\Delta V_{bias}$ is within the corresponding progression level thresholds, block 126 determines if the respective secondary measurement $\Delta V_{sec}$ is within an adaptation region corresponding to the progression level of the mask L, and if so, block 128 adds the corresponding adaptation value to the net threshold adaptation amount $T_A$. As indicated at block 128, the adaptation value is stored in the matrix as a function of the secondary measurement $\Delta V_{sec}$ and the progression level mask L. Unlike most secondary measures, a single vehicle speed value (i.e., the speed at the onset of the crash event) is used for the duration of the crash event. Accordingly, the cumulative or summed adaptation amount based on vehicle speed, $T_A$(speed), is limited as indicated in block 128.

After the net threshold adaptation amount $T_A$ is determined for each progression level mask L of each secondary measurement $\Delta V_{sec}$, the blocks 134–138 are executed to bias the $\Delta V$ Threshold toward its default value (initialization threshold) if the event progression level is "a"—i.e., no activity. Block 134 determines if the event progression is at level "a". If so, block 136 compares the $\Delta V$ Threshold to the Initialization Threshold. If the $\Delta V$ Threshold has been adjusted to a value less than the Initialization Threshold, block 138 sets the net threshold adaptation amount $T_A$ to a positive incremental value, referred to in FIG. 5 as + Threshold Recover. Conversely, if the $\Delta V$ Threshold has been adjusted to a value greater than the Initialization Threshold, block 138 sets the net threshold adaptation amount $T_A$ to a negative incremental value, referred to in FIG. 5 as − Threshold Recover.

In summary, the deployment method of this invention provides a flexible framework for providing a high level of immunity to spurious acceleration signals and distinguishing between deployment events and non-deployment events on the basis of the vehicle speed (absolute and/or relative) at the onset of the crash event. The degree of influence of the speed measure on the deployment threshold depends on the event progression level, and the adjustments serve to increase or decrease the likelihood of deployment in the course of a crash event. When the crash event is over, the threshold is biased back to an initialization or default level providing the desired immunity to spurious events. While described in reference to the illustrated embodiment, it is expected that various modifications in addition to those suggested above will occur to those skilled in the art. In this regard, it will be understood that this invention is not limited to the illustrated embodiment, and that deployment methods incorporating such modifications may fall within the scope of this invention, which is defined by the appended claims.

What is claimed is:

1. In a vehicular supplemental restraint system having a sensor providing a vehicle acceleration signal, a restraint device and a controller for deploying the restraint device for vehicle occupant protection in a crash event when a measure of crash severity based on the acceleration signal exceeds a deployment threshold, the improvement wherein the controller:

initializes the deployment threshold at a default level prior to the crash event;

determines an event progression signal during the crash event based on the acceleration signal, and an event progression level based on the magnitude of the event progression signal relative to one or more predefined event progression thresholds;

determines a measure of vehicle velocity at the onset of the crash event; and periodically adjusts the deployment threshold during the crash event based on the measure of vehicle velocity and event progression level.

2. The improvement of claim 1, wherein the measure of vehicle velocity is the vehicle velocity a predetermined period of time prior to: the acceleration signal exceeding a predetermined threshold, or the achievement of a specified event progression level.

3. The improvement of claim 1, wherein the measure of vehicle velocity includes a measure of the velocity of the vehicle relative to an obstacle in a travel path of the vehicle.

4. The improvement of claim 1, wherein the controller forms velocity thresholds as a function of the determined event progression level, and the deployment threshold is periodically adjusted during the course of the crash event by adjustment amounts selected based on a comparison of the vehicle velocity measure with said velocity thresholds.

5. The improvement of claim 4, wherein said adjustment amounts are summed in the course of the crash event, and the controller limits the summation of said adjustment amounts to a predefined limit value, thereby limiting the adjustment of said deployment threshold due to said vehicle velocity measure.

6. A control method for a vehicular supplemental restraint system having a sensor providing a vehicle acceleration signal, a restraint device that can be deployed in a crash event for vehicle occupant protection, the method comprising the steps of:

initializing a deployment threshold at a default level prior to the crash event;

determining an event progression signal during the crash event based on the acceleration signal;

determining an event progression level based on the magnitude of the event progression signal relative to one or more predefined event progression thresholds;

determining a measure of vehicle velocity at the onset of the crash event;

periodically adjusting the deployment threshold during the crash event based on the measure of vehicle velocity and event progression level; and deploying the restraint device when a measure of crash severity based on the acceleration signal exceeds the deployment threshold.

7. The control method of claim 6, wherein the measure of vehicle velocity is determined as the vehicle velocity a predetermined period of time prior to: the acceleration signal exceeding a predetermined threshold, or the achievement of a specified event progression level.

8. The control method of claim 6, wherein the step of determining a measure of vehicle velocity includes measuring of the velocity of the vehicle relative to an obstacle in a travel path of the vehicle.

9. The control method of claim 6, including the steps of:

selecting velocity thresholds as a function of the determined event progression level; and periodically adjusting the deployment threshold during the course of the crash event by adjustment amounts selected based on a comparison of the vehicle velocity measure with the selected velocity thresholds.

10. The control method claim 9, including the steps of:

summing the adjustment amounts in the course of the crash event; and limiting the summation of said adjustment amounts to a predefined limit value, thereby limiting the adjustment of said deployment threshold due to said vehicle velocity measure.

* * * * *